United States Patent
Takahashi

(10) Patent No.: US 10,423,213 B2
(45) Date of Patent: Sep. 24, 2019

(54) IMAGE FORMING APPARATUS

(71) Applicant: TOSHIBA TEC KABUSHIKI KAISHA, Shinagawa-ku, Tokyo (JP)

(72) Inventor: Toshiharu Takahashi, Setagaya Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/044,989

(22) Filed: Jul. 25, 2018

(65) Prior Publication Data
US 2019/0196570 A1    Jun. 27, 2019

(30) Foreign Application Priority Data

Dec. 22, 2017  (JP) ................. 2017-246238

(51) Int. Cl.
G06F 1/3234 (2019.01)
G06F 3/12 (2006.01)
G06F 1/3215 (2019.01)

(52) U.S. Cl.
CPC .......... G06F 1/3284 (2013.01); G06F 1/3215 (2013.01); G06F 3/1229 (2013.01)

(58) Field of Classification Search
None
See application file for complete search history.

(56) References Cited

U.S. PATENT DOCUMENTS

| 2008/0270814 | A1* | 10/2008 | Starr | G06F 1/3203 713/323 |
| 2009/0284790 | A1 | 11/2009 | Ohashi | |
| 2016/0269384 | A1* | 9/2016 | Suga | H04L 63/08 |
| 2018/0113654 | A1 | 4/2018 | Yeung | |

FOREIGN PATENT DOCUMENTS

| EP | 3 101 595 A2 | 12/2016 |
| JP | 2013-146048 A | 7/2013 |
| JP | 2013-161246 A | 8/2013 |
| JP | 2017-081085 A | 5/2017 |

OTHER PUBLICATIONS

Search Report dated Apr. 18, 2019 received in corresponding European application No. 18 21 4109.3, 10 pages.

* cited by examiner

Primary Examiner — Lennin R Rodriguezgonzalez
(74) Attorney, Agent, or Firm — Foley & Lardner LLP

(57) ABSTRACT

An image forming apparatus includes a communication interface configured to communicate with a portable terminal capable of receiving a signal from a transmitter in a detection area. A processor of the apparatus is configured to determine whether to shift to an operable state from a sleep state based on user information contained in proximity information when the proximity information, containing the user information indicating that a user enters the detection area, is received by the communication interface from the portable terminal receiving a signal from the transmitter.

14 Claims, 4 Drawing Sheets

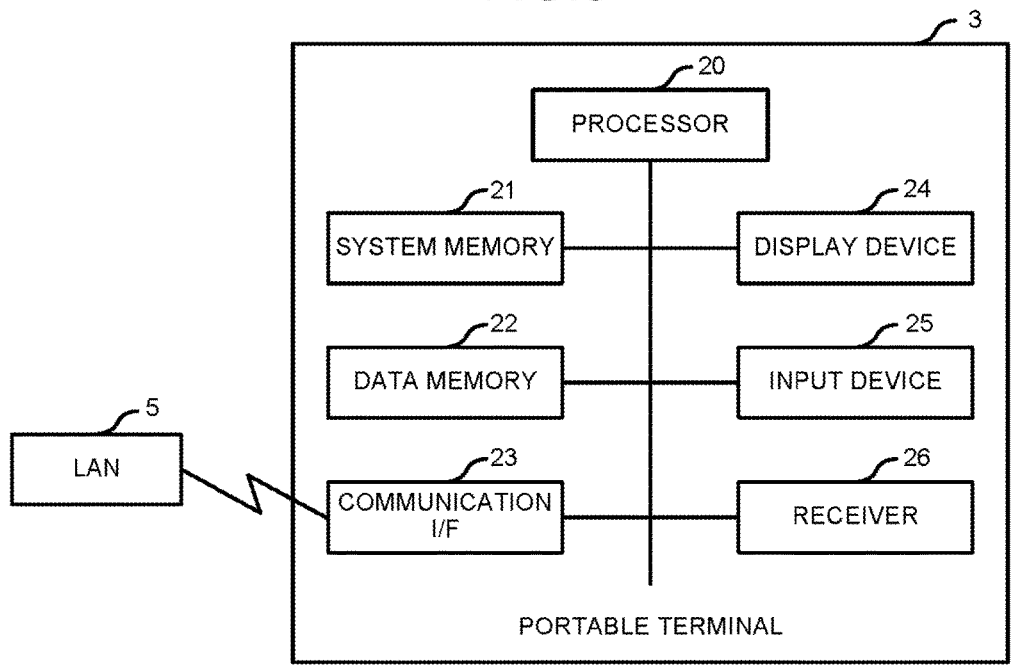
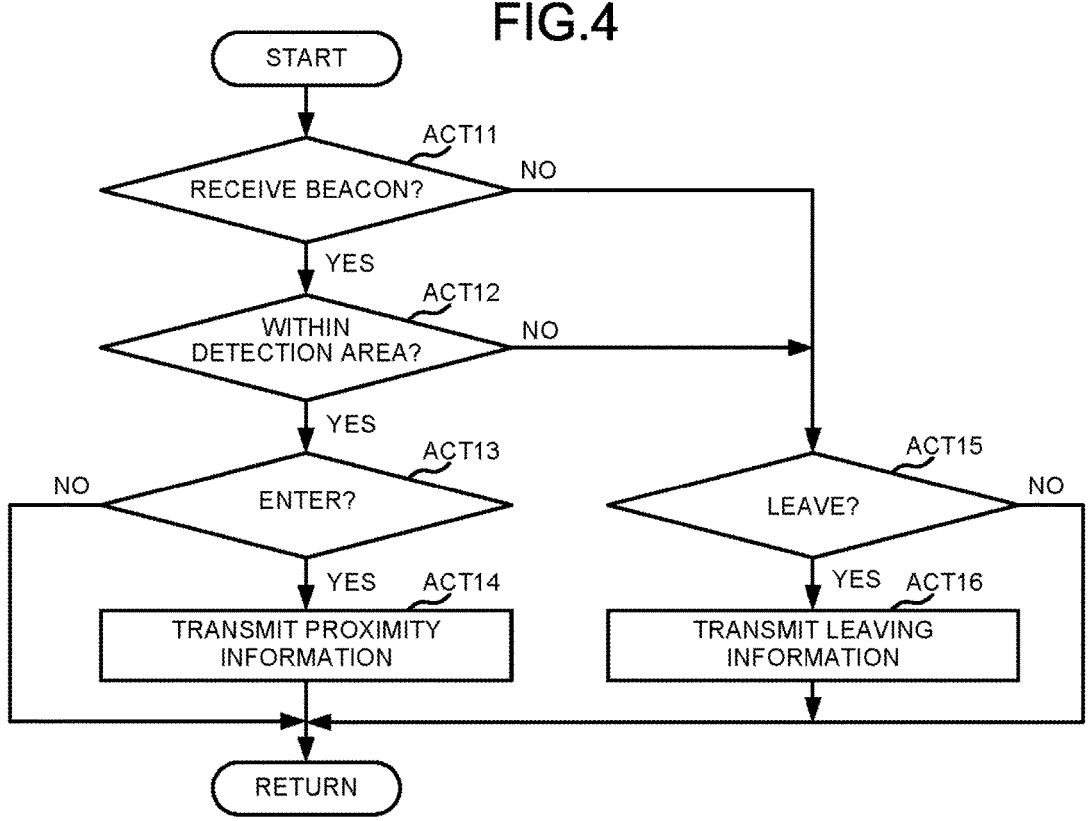

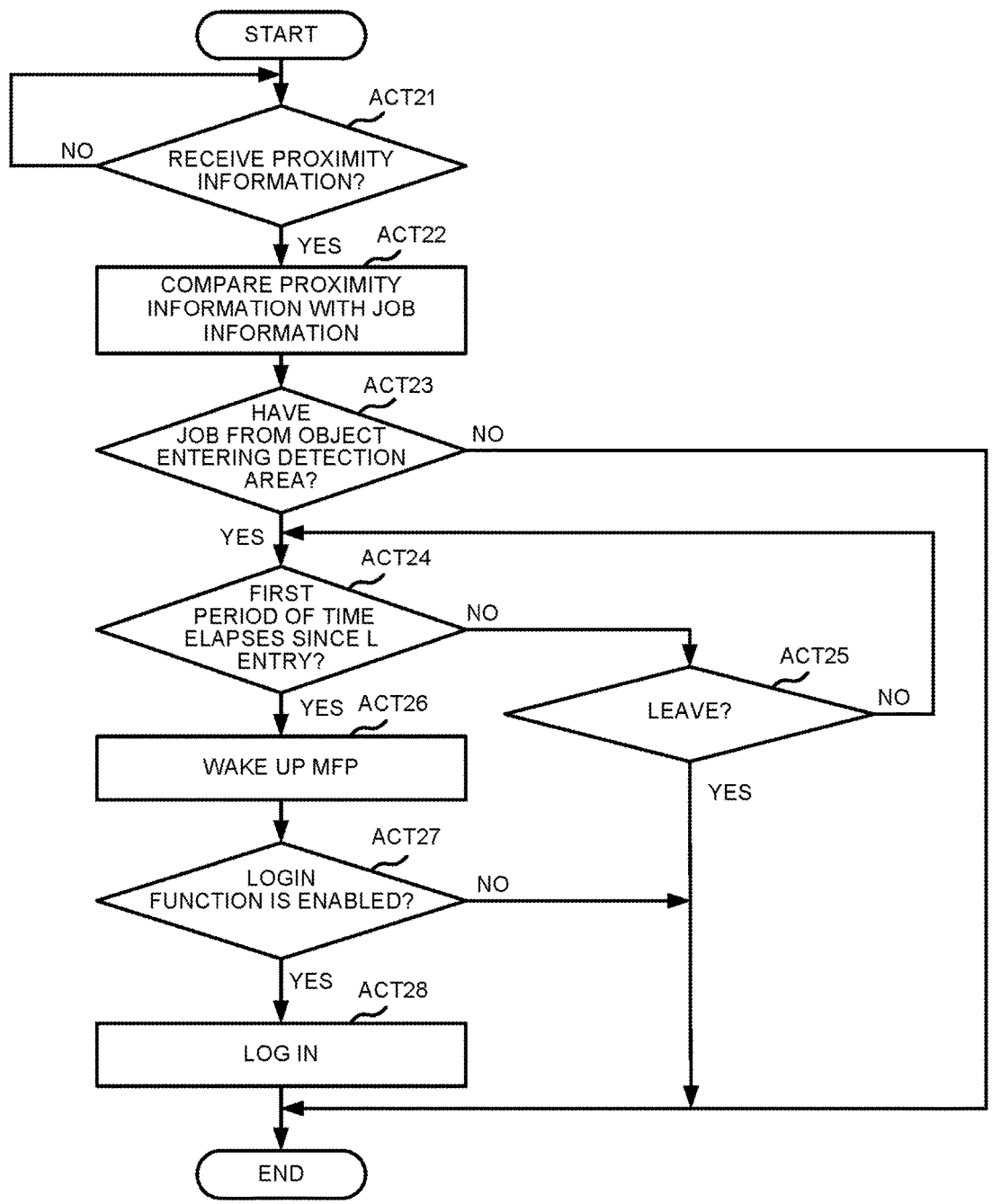

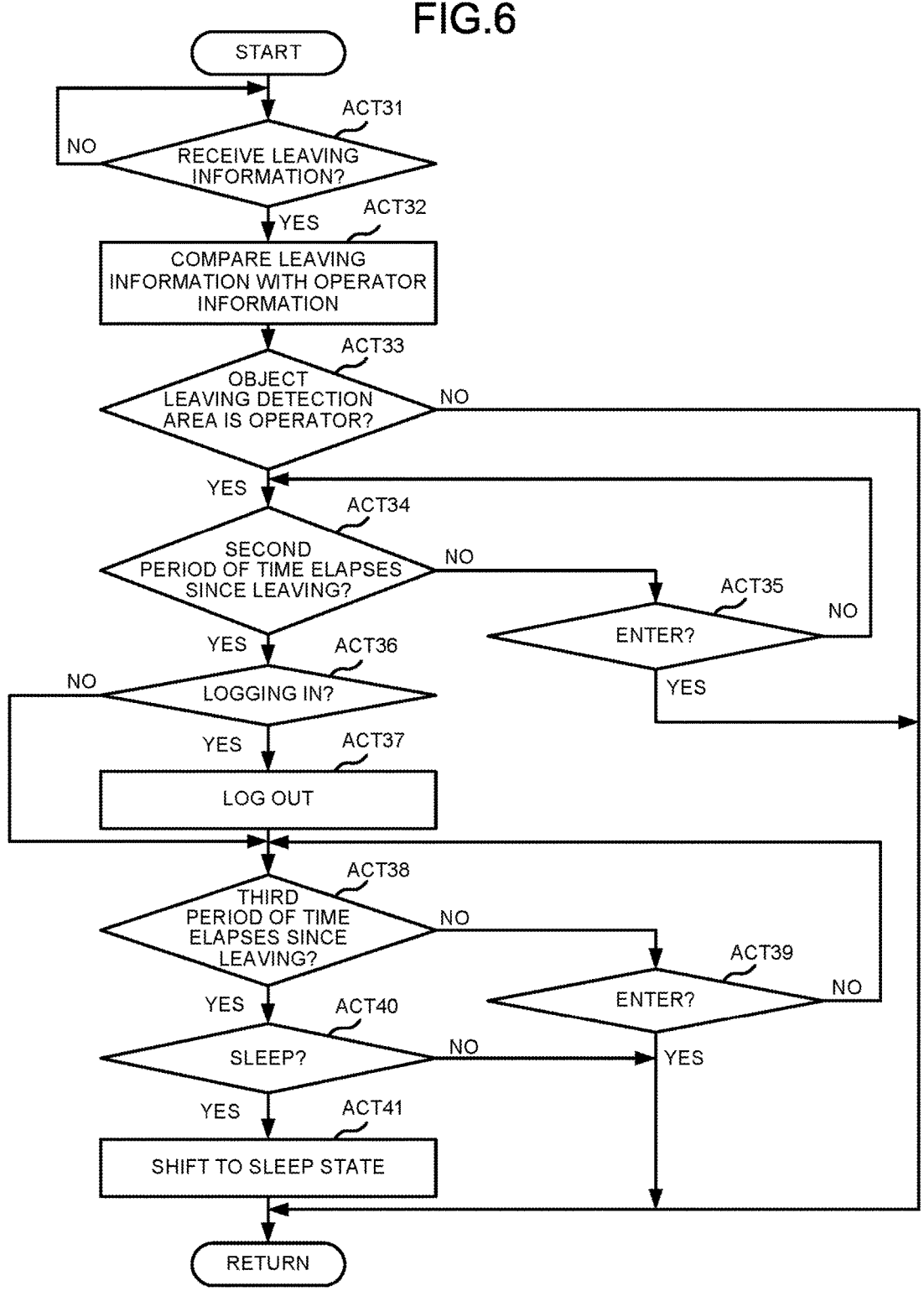

IMAGE FORMING APPARATUS

CROSS-REFERENCE TO RELATED APPLICATION

This application is based upon and claims the benefit of priority from Japanese Patent Application No. 2017-246238, filed Dec. 22, 2017, the entire contents of which are incorporated herein by reference.

FIELD

Embodiments described herein relate generally to an image forming apparatus.

BACKGROUND

A conventional digital MFP (Multi-Function Peripheral) having a printer and a scanner has a function (sleep function) of entering a sleep state in which an operation of each section is stopped to reduce power consumption. The digital MFP in the sleep state can perform various processes by waking up (shifting to an operable state) in response to a predetermined trigger. For example, there is a digital MFP having a function of detecting approach of a user with a human sensor and then waking up.

However, in a wake-up control in response to the detection of a person by the human sensor, the digital MFP wakes up irrespective of an intention of behavior of the detected person. For example, if the digital MFP also wakes up when a person who does not use the digital MFP is detected, the electric power is wasted.

DESCRIPTION OF THE DRAWINGS

FIG. 3 is a block diagram illustrating an example of a configuration of a portable terminal according to at least one embodiment;

FIG. 4 is a flowchart for depicting an example of the operation of the portable terminal according to at least one embodiment;

FIG. 5 is a flowchart for depicting an example of the operation when proximity information is received in the digital MFP according to at least one embodiment; and FIG. 6 is a flowchart for depicting an example of the operation when leaving information is received in the digital MFP according to one embodiment.

DETAILED DESCRIPTION

In accordance with at least one embodiment, an image forming apparatus comprises a communication interface configured to communicate with a portable terminal capable of receiving a signal from a transmitter in a detection area; and a processor configured to determine whether to shift to an operable state from a sleep state based on user information contained in proximity information when the proximity information, containing the user information indicating that a user enters the detection area, is received by the communication interface from the portable terminal receiving a signal from the transmitter.

Hereinafter, at least one embodiment will be described with reference, to the accompanying drawings.

Figure 1:
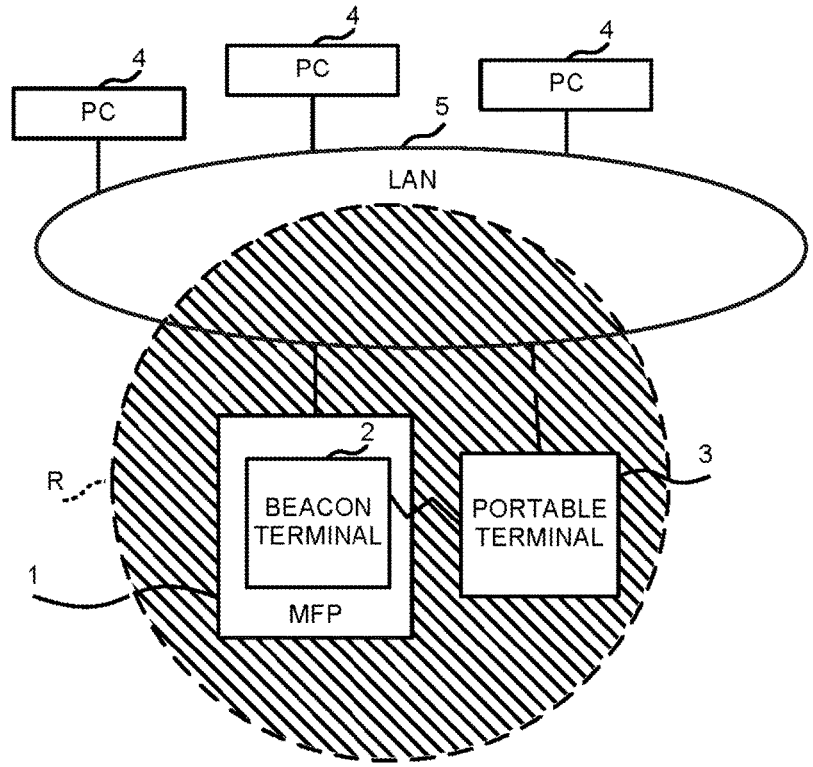
FIG. 1 is a diagram illustrating an example of a configuration of an information processing system according to at least one embodiment.

FIG. 1 is a block diagram illustrating an example of a configuration of an information processing system including a digital multi-function peripheral (MFP) 1 according to at least one embodiment.

In the example of the configuration shown in FIG. 1, the information processing system according to at least one embodiment has the MFP 1, a portable terminal 3, and a PC 4. The digital MFP 1, the portable terminal 3 and the PC 4 are connected with each other via a LAN (Local Area Network) 5. The LAN 5 may be of a wired type or a wireless type, or may be a combination of the wired type and the wireless type.

The MFP 1 is a multi-function information processing apparatus including an image forming apparatus. The MFP 1 has a printer, a scanner, a communication interface, and the like. The MFP 1 realizes a copying (copy) function, a printer function, a scanner function, a facsimile function, and the like. For example, the digital MFP 1 receives a print job from the portable terminal 3 or the PC 4 via the LAN 5 as a printer function, and executes a printing process according to the print job. As the scanner function, the digital MFP 1 transmits an image read by the scanner to the portable terminal 3 or the PC 4, or stores the read image in a designated storage device. The MFP 1 may be an image forming apparatus at least having a printer.

The MFP 1 may be used by an individual person at home alone, or may be used several persons such as a large number of persons or more. For example, the MFP used by many persons has a function (login function) with which a user needs to log into the MFP first to use it, and needs to log out after use. The MFP 1 having the login function can improve the convenience and security of each user even if the MFP 1 is used by many persons. Herein, the MFP 1 according to the present embodiment is used by a plurality of users and has the login function.

The MFP 1 has a sleep function to enter a sleep state (power saving mode state) in order to reduce power consumption when not in use. The digital MFP 1 shifts to the sleep state if a preset sleep condition (e.g., if a non-operation period is equal to or longer than set time, or a period in which no job is received is equal to or longer than the set time) is satisfied. In the sleep state, the MFP 1 stops supply of electric power to each section such as a printer, a scanner, etc., except for the supply of the electric power to each section for performing data communication and control instruction. The digital MFP 1 has a function of shifting (waking up) from the sleep state to an operable state if a preset wakeup condition (e.g., if an operation is input or if a job is received) is satisfied.

A beacon terminal (transmitter) 2 transmits a signal (beacon signal) for a beacon. The beacon terminal 2 may be any device as long as it can always transmit the beacon signal. For example, the beacon terminal 2 may transmit a signal by conforming to a low power consumption type Bluetooth® Technology. The beacon terminal 2 transmits a signal with a signal strength equal to or higher than a predetermined threshold value in a detection area set as a base point of the digital MFP 1.

The beacon terminal 2 transmits a signal including information (for example, identification information of the MFP) indicating the corresponding MFP 1 in the detection area. In the present embodiment, the beacon terminal 2 transmits a signal including unique identification information (unique ID) containing the identification information of the MFP (or beacon terminal). For example, the beacon terminal 2 may transmit a signal including three types of information, i.e., a unique ID (UID), a major value, and a minor value. In this case, the UID may be 128 bits, and the major value and the minor value may be 16-bit integers.

In at least one embodiment, the beacon terminal 2 is connected to the digital MFP 1. In at least one embodiment, the beacon terminal 2 operates by receiving the supply of the electric power from the digital MFP 1, and can be controlled by the digital MFP 1. However, the beacon terminal 2 may not be connected to the digital MFP 1. For example, the beacon terminal 2 may be installed in the vicinity of the digital MFP 1 so as to transmit the beacon signal within the detection area as a separate device from the digital MFP 1. The beacon terminal 2 may receive the electric power from an external power supply such as a small battery or a dry battery.

The portable terminal 3 is an electronic device carried by a user. The portable terminal 3 may be any device as long as it has a function of receiving the beacon signal and a function of transmitting information to the digital MFP 1. For example, the portable terminal 3 is a smartphone, a wearable terminal, a mobile phone, a tablet PC, or the like. The portable terminal 3 carries out various processes by executing an application program (hereinafter, also simply referred to as an app). For example, the portable terminal 3 can be connected to the digital MFP 1 according to connection information such as a set SSID and a password, and can perform printing with the digital MFP 1. In at least one embodiment, the portable terminal 3 has a function of performing printing by sending a print job including image data for printing and various information (user information, print setting, etc.) to the digital MFP 1.

The PC 4 connected to the digital MFP 1 via the LAN 5. The PC 4 carries out various processes by executing an application program (hereinafter, also simply referred to as an app). In at least one embodiment, the PC 4 can perform printing with the digital MFP 1 by executing a printer driver as an app for printing. The PC 4 performs printing by sending a print job including image data for printing and various information (user information, print setting, etc.) to the digital MFP 1.

Next, the configuration of the digital MFP 1 is described.

Figure 2:
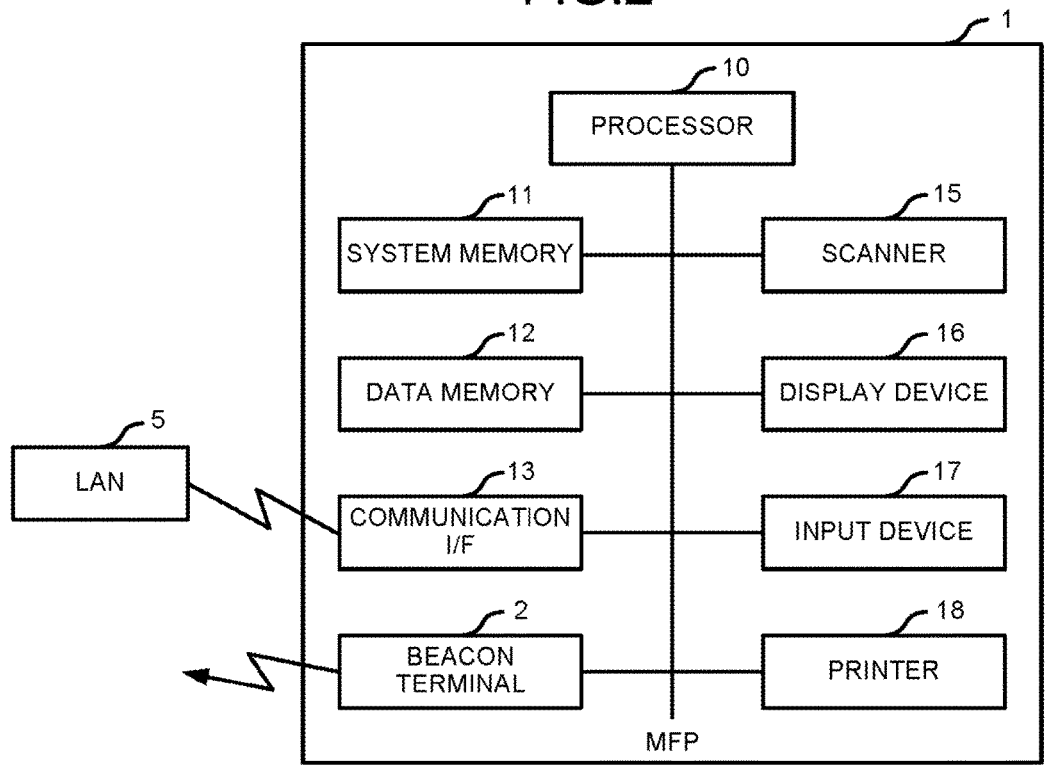
FIG. 2 is a block diagram illustrating an example of a configuration of a digital MFP according to at least one embodiment.

FIG. 2 is a block diagram illustrating an example of a configuration of the digital MFP 1 according to the embodiment.

As shown in FIG. 2, the MFP 1 includes a processor 10, a system memory 11, a data memory 12, a communication I/F 13, a scanner 15, a display device 16, an input device 17, a printer 18, and the beacon terminal 2.

The processor 10 carries out various processes by executing a program. The processor 10 is, for example, a CPU (central processing unit). The processor 10 may be connected to each section in the MFP 1 via a bus. The processor 10 executes various processes by executing the program stored in the system memory 11 or the data memory 12. For example, the processor 10 executes a basic operation control of the MFP 1 by executing an OS (Operating System) program. The processor 10 executes various processes by executing application programs designed in response to processing contents.

The system memory 11 is a memory grow used by the processor 10 to operate, and includes a RAM, a ROM, and the like. The RAM is a volatile memory. The RAM is used as a working area for temporarily storing data to be used. The ROM is a nonvolatile memory. The ROM stores various programs such as the OS program or application programs to be executed by the processor 10.

The data memory 12 is a rewritable nonvolatile memory. The data memory 12 is a memory device such as a HDD (hard disk drive), a SSD (solid state drive), an EEPROM® Technology (electric erasable programmable read-only memory), for example. The data memory 12 stores data to be used in various processes executed by the processor 10. For example, the data memory 12 stores setting information for the operation of the MFP 1. The data memory 12 may store the OS or the application.

The communication I/F 13 is used for data communication. In at least one embodiment, the communication I/F 13 functions as an interface for communicating with the portable terminal 3 and the PC 4 via the LAN 5. The communication I/F 13 may be any interface as long as it can communicate with the portable terminal 3 and the PC 4. For example, the communication I/F 13 may directly perform wireless communication with the portable terminal 3 without going through the LAN 5. The communication I/F 13 may be used for communicating with an external device via a network including a WAN (Wide Area Network) so as to perform transmission and reception of facsimile.

The scanner 15 reads an image of a document as image data. For example, the scanner 15 optically scans the image of the document to acquire the image data. In this case, the scanner 15 may include an image capturing element such as a CCD (Charge-Coupled Device) image sensor and an optical system for guiding light from the document to the image capturing element. The scanner 15 may read the image by other methods.

The display device 16 displays information. The display device 16 is, for example, a liquid crystal display or an organic EL (electro-luminescence) display. The input device 17 receives an operation by an operator (user or administrator). The input device 17 is, for example, a touch panel, a keyboard, a numeric keypad, and the like. The display device 16 and the input device 17 constitutes an operation device. For example, the operation device for the user or administrator to operate the MFP 1 may include a display panel (display device 16) having a touch panel as the input device 17.

The printer 18 prints an image on an image receiving medium such as a sheet. The printer 18 is not limited to a specific image forming system. For example, the printer 18 may be an electrophotographic system, an inkjet system, or a thermal transfer system. In at least one embodiment, the printer 18 is a printer of the electrophotographic system.

The beacon terminal 2 transmits a signal (beacon signal) with a signal strength equal to or higher than a predetermined threshold value in the detection area in the vicinity of the digital MFP 1. In the configuration shown in FIG. 1, the beacon terminal 2 is connected to the processor 10 of the MFP 1. In the example of the configuration shown in FIG. 1, the processor 10 may control the signal transmitted by the beacon terminal 2. For example, the processor 10 may adjust the strength of the signal transmitted by the beacon terminal 2.

Next, the configuration of the portable terminal 3 is described.

FIG. 3 is a block diagram illustrating an example of a configuration of the portable terminal 3 according to at least one embodiment.

As shown in FIG. 3, the portable terminal 3 may include a processor 20, a system memory 21, a data memory 22, a communication I/F 23, a display device 24, an input device 25, and a receiver 26.

The processor 20 and the system memory 21 constitute a controller for controlling the portable terminal 3. The processor 20 carries out various processes by executing a program. The processor 20 is, for example, a CPU. The processor 20 may be connected to each section in portable terminal 3 via a bus. The processor 20 executes various processes by executing the program stored in the system memory 21 or the data memory 22. For example, the processor 20 executes a basic operation control of the portable terminal 3 by executing an OS (Operating System) program. The processor 20 executes various processes by executing application programs designed in response to processing contents.

The system memory 21 is a memory used by the processor 20 to operate. For example, the system memory 21 includes a RAM and a ROM. The RAM is a volatile memory. The RAM is used as a working area for temporarily storing data to be used. The ROM is a nonvolatile memory. The ROM stores various programs such as the OS program or application programs to be executed by the processor 20.

The data memory 22 is a rewritable nonvolatile memory. The data memory 22 is a HDD, a SSD, an EEPROM® Technology. The data memory 22 stores various application programs, control data, user data and the like.

The communication I/F 23 is used for data communication. In at least one embodiment, the communication I/F 23 communicates with the MFP 1. The communication I/F 23 may communicate with the MFP 1 via the network 5, or may communicate with the MFP 1 without going through the network. The communication I/F 23 may perform wireless communication or wired communication. For example, the communication I/F 23 communicates with the MFP 1 via a network including a wireless LAN or a wired LAN. The communication I/F 23 may communicate with the MFP 1 via a network including the WAN. Furthermore, the communication I/F 23 may perform a short-range wireless communication.

The display device 24 comprises a display. The display content of the display device 24 is controlled by the processor 20. The input device 25 is, for example, a touch panel, a keyboard, a numeric keypad, and the like. The input device 25 supplies an operation instruction input by the user or the administrator to the processor 20. The display device 24 and the input device 25 are constituted by a display device attached with a touch panel.

The receiver 26 receives a signal transmitted from the beacon terminal 2. The processor 20 determines the signal strength of the beacon signal received by the receiver 26. In at least one embodiment, the processor 20 has a function of determining whether or not the signal strength of the beacon signal received by the receiver 26 is equal to or higher than a predetermined threshold value. The receiver 26 may output to the processor 20 a signal indicating whether or not the signal strength of the received beacon signal is equal to or higher than the predetermined threshold (or whether or not it is within the detection region).

Next, the operation of the portable terminal 3 according to the present embodiment is described.

FIG. 4 is a flowchart for depicting an example of the operation of the portable terminal 3 according to the present embodiment.

In the portable terminal 3, an application program (hereinafter, also simply referred to as an app) to be executed by the processor 20 is installed in the system memory 21 or the data memory 22. The processor 20 executes various processes described later by executing the app. For example, the processor 20 realizes a function of receiving the beacon signal, a function of determining whether it is within the detection area, a function of transmitting the information to the MFP 1 by executing the app.

If the processor 20 of the portable terminal 3 executes the app for connecting to the MFP 1, the receiver 26 is prepared to receive the beacon signal transmitted by the beacon terminal 2. Upon reception of the signal from the beacon terminal 2 (Yes in ACT 11), the processor 20 determines whether the portable terminal 3 is within the detection area (ACT 12).

For example, if the strength of the signal received by the receiver 26 is equal to or higher than the predetermined threshold value, the processor 20 determines that the portable terminal 3 is within the detection area. A distance between the beacon terminal 2 and the portable terminal 3 (the receiver 26 of the portable terminal 3) is estimated by the strength of the beacon signal received by the receiver 26. If the strength of the beacon signal is set to be equal to or higher than the predetermined threshold value within the detection region, the processor 20 can determine whether or not the portable terminal 3 is within the detection region based on the signal strength received by the receiver 26. In other words, if a user who carries the portable terminal 3 enters the detection area, the processor 20 receives the signal from the beacon terminal 2 with the signal strength equal to or higher than the predetermined threshold value by the receiver 26. Thus, the processor 20 determines that the portable terminal 3 is within the detection area.

If it is determined that the portable terminal 3 is within the detection area, the processor 20 determines whether the portable terminal 3 moves to (enters) the inside of the detection area from the outside of the detection area (ACT 13). For example, if the strength of the signal received by the receiver 26 becomes equal to or higher than the predetermined threshold value from a state of being smaller than the predetermined threshold value, the processor 20 determines that the portable terminal 3 enters the detection area from the outside of the detection area. If it is determined that the portable terminal 3 enters the detection area (Yes in ACT 13), the processor 20 transmits proximity information (entry information) indicating entry to the detection area to the MFP 1 (ACT 14).

For example, the processor 20 specifies the identification information of the MFP 1 contained in the unique ID contained in the signal from the beacon terminal 2 received by the receiver 26. If the identification information of the MFP 1 is specified, the processor 20 generates the proximity information indicating that the portable terminal enters the detection area of the MFP specified by the identification information. The proximity information contains user information. The user information contained in proximity information is, for example, the identification information of the portable terminal 3, the identification information of the user, or information indicating both of them. If the proximity information is generated, the processor 20 transmits the proximity information to the MFP 1 specified by identification information contained in the beacon signal via the LAN 5 through the communication I/F 23.

If the portable terminal 3 is beyond the detection area, the processor 20 determines whether the portable terminal 3 moves (leaves) from the inside of the detection area to the outside of the detection area (ACT 15). For example, if the strength of the signal received by the receiver 26 becomes less than the predetermined threshold value from a state of being equal to or higher than the predetermined threshold value, the processor 20 determines that the portable terminal 3 moves to the outside of the detection area from the inside of the detection area (leaves the detection area). If it is determined that the portable terminal 3 leaves the detection area (Yes in ACT 15), the processor 20 transmits the leaving information to the MFP 1 (ACT 16).

For example, the processor 20 specifies the identification information of the MFP 1 contained in the unique ID contained in the beacon signal received by the receiver 26 immediately before leaving the detection area. The processor 20 generates the leaving information indicating that the portable terminal leaves the detection area of the MFP specified by the identification information contained in the beacon signal received immediately before leaving. The leaving information includes user information. The user information contained in the leaving information is, for example, the identification information of the portable terminal 3, the identification information of the user who carries the portable terminal 3, or information indicating both of them. If the leaving information is generated, the processor 20 transmits the leaving information to the MFP 1 specified by the identification information contained in the beacon signal using the communication I/F 23.

By repeatedly executing the above process, the portable terminal transmits the proximity information containing the user information to a certain MFP via the network when entering the detection area of the MFP. The portable terminal transmits the leaving information containing the user information to a certain MFP via the network when leaving the detection area of the MFP. The user information contained in the proximity information and the leaving information is the identification information of the user, or information indicating both of them. Specifically, the portable terminal can determine whether or not it is within the detection area according to the signal from the beacon terminal and can provide the proximity information or the leaving information including the user information to the MFP.

Next, the operation of the MFP 1 according to the present embodiment is described.

The MFP 1 is communicable with the portable terminal 3 or the PC 4 via the LAN 5. For example, the MFP 1 receives a processing request such as a print request from the portable terminal 3 or the PC 4 capable of communicating with the MFP 1 via the LAN 5. The MFP 1 manages the processing request received from the portable terminal 3 or the PC 4 as a job. The job is held as a job information including information indicating a processing content and information indicating processing request source.

For example, the MFP 1 manages the print request from the portable terminal 3 or the PC 4 as a printing job including information indicating a printing content and information indicating a print request source. The information indicating the print request source includes the user information indicating a device which issues the print request or user who requests printing. For example, the user information is the identification information of the device (the portable terminal or the PC) which issues the print request, the identification information of the user who requests printing, or information indicating both of them. The MFP 1 stores the job such as the print job as job information in the data memory 12 and executes a process based on the job information at a predetermined timing.

In at least one embodiment, the MFP 1 can receive information from the portable terminal 3 via the LAN 5 even in the sleep state. The MFP 1 in the sleep state receives the proximity information indicating that the portable terminal 3 which receives the signal from the beacon terminal 2 enters the detection area. If the proximity information is received in the sleep state, the MFP 1 shifts (wakes up) from the sleep state to the operable state according to the received proximity information. For example, the MFP 1 wakes up if the print request source of the print job stored in the data memory 12 is coincident with the portable terminal 3 or the user entering the detection area. The MFP 1 may perform login if the print request source of the print job is coincident with the portable terminal 3 or the user entering the detection area.

FIG. 5 is a flowchart for depicting an example of the operation if the MFP 1 receives the proximity information from the portable terminal 3 according to at least one embodiment.

The processor 10 of the MFP 1 enters a state in which the proximity information from the portable terminal 3 through the communication I/F 23 via the LAN 5 can be received even in the sleep state (ACT 21). If the proximity information is received (Yes in ACT 21), the processor 10 compares the proximity information received from the portable terminal 3 with the job information held in the data memory 12 (ACT 22).

By comparing the proximity information with the job information, the processor 10 determines whether or not an object entering the detection area (the portable terminal or the user that enters the detection area) indicated by the user information contained in the proximity information is coincident with the user information of the job request source contained in the job information (ACT 23). Here, the user information contained in the proximity information includes information indicating the object entering the detection area (the portable terminal or the user). The user information of the job request source includes information indicating the user who requests the job or the device which requests the job.

For example, the processor 10 determines whether or not the identification information of the user contained in the proximity information is coincident with the identification information of the user who requests the printing which is contained in the job information. The processor 10 may determine whether or not the identification information of the portable terminal contained in the proximity information is coincident with the identification information of the device which requests the printing which is contained in the job information.

If there is job information coincident with the user information of the proximity information (Yes in ACT 23), the processor 10 monitors elapsed time since the object entering the detection area (the portable terminal or the user) enters the detection area (ACT 24). The processor 10 also monitors whether an object entering the detection area detected by the proximity information leaves the detection area (ACT 25).

Here, the MFP 1 shifts (wakes up) from the sleep state to the operable state if the object entering the detection area continues to stay in the detection region for a first period of time or longer. The first period of time can be set by the user or the administrator. For example, by setting the first period of time to "0", the MFP 1 can wake up immediately after it detects the object entering the detection area. If the first period of time is lengthened, in a case in which the user who carries the portable terminal 3 passes through the detection area in a short time within the first period of time (for example, unintentionally crosses the detection area), it is possible to prevent the MFP 1 from waking up.

If the object entering the detection area leaves the detection area before the first period of time elapses (Yes in ACT 25), the processor 10 terminates the monitoring of the object entering the detection area and continues the sleep state. In this case, the processor 10 may return to the process in ACT 21 to enter a state in which it can receive the information from the portable terminal 3 in the sleep state.

If the first period of time elapses while the object entering the detection area remains in the detection area (Yes in ACT 24), the processor 10 shifts (wakes up) from the sleep state to the operable state (ACT 26). For example, if there is a print job being held, the processor 10 supplies the electric power to each drive section of the printer 18 to shift to a state in which a printing process can be executed. If the MFP 1 wakes up, the processor 10 may display a message indicating that the MFP 1 is executing a wake-up operation on the display device 16.

If the MFP 1 wakes up based on the proximity information, the processor 10 determines whether or not the login function is enabled according to the proximity information (ACT 27). If the login function is enabled (Yes in ACT 27), the processor 10 executes a login process according to the user information contained in the proximity information (ACT 28). For example, the processor 10 displays an operation menu screen set for each user as the login processing on the display device 16.

Here, in the MFP 1, whether to execute the login of the user who enters the detection area based on the proximity information may be set by the user or the administrator. For example, if the MFP 1 wakes up due to the proximity information, it may be set that the processor 10 executes the login process of the user based on the proximity information. If such login function is set to be enabled, the MFP 1 can omit the operation for the login process by the user who enters the detection area.

In the example of the operation shown in FIG. 5, the wakeup operation and the operation for performing the login when there is the job information that is coincident with the user information of the proximity information are described. However, if there is the user information of a registrant registered beforehand which is coincident with the user information of the proximity information, the MFP 1 may execute the wakeup operation and the login operation. Specifically, if the user information of the proximity information is coincident with the user information of the registrant, the processor 10 may enable the MFP 1 to wake up and perform the login as the user of the user information.

According to the above operation, the MFP can detect that the user who carries the portable terminal capable of receiving the signal from the beacon terminal enters the detection area according to the proximity information from the portable terminal. The MFP in the sleep state can wake up if the information contained in the proximity information received from the portable terminal is coincident with the job information being held. As a result, as soon as the portable terminal or the user that requests the job to the MFP 1 enters the detection area, the MFP 1 can wake up. Furthermore, the MFP can wake up if the first period of time elapses since the entry to the detection area, thereby making it possible to reduce wasteful wake-up operation of the MFP.

Next, an example of the operation when the MFP 1 receives the leaving information from the portable terminal 3 is described according to at least one embodiment.

FIG. 6 is a flowchart for depicting an example of the operation when the MFP 1 receives the leaving information from the portable terminal 3.

The processor 10 of the MFP 1 can receive the leaving information from the portable terminal 3 through the communication I/F 23 via the LAN 5 (ACT 31). If the leaving information is received (Yes in ACT 31), the processor 10 compares the user information contained in the received leaving information with the operator information indicating the user (operator) who uses the MFP 1 (ACT 32). Here, the user information contained in the leaving information includes information indicating an object leaving the detection area (the portable terminal or the user). The operator information includes the identification information of the user (operator) who uses the MFP 1 or the identification information of the portable terminal carried by the operator. The operator information may be the identification information of the user who logs into the MFP or the identification information of the portable terminal used by the user who is logging in.

By comparing the leaving information with the operator information, the processor 10 determines whether or not the user information contained in the leaving information is coincident with the user information contained in the operator information (ACT 33). For example, the processor 10 determines whether the identification information of the user contained in the leaving information is coincident with the identification information of the user contained in the operator information. The processor 10 may determine whether or not the identification information of the portable terminal contained in the leaving information is coincident with the identification information of the portable terminal of the operator contained in the operator information.

If it is determined that the object leaving the detection area is the operator who uses the MFP 1 (Yes in ACT 33), the processor 10 monitors the elapsed time since the object leaving the detection area (the portable terminal or the user) leaves the detection area (ACT 34). While monitoring the elapsed time, the processor 10 also monitors whether the object leaving the detection area enters the detection area again (ACT 35).

Here, the MFP 1 has a setting for performing logout for the object leaving the detection area if a second period of time or longer elapses since the object leaving the detection area leaves the detection area. The second period of time may be set by the administrator or the user. For example, by setting the second period of time to "0", the MFP 1 can perform logout for the user immediately after detecting the object leaving the detection area. If the second period of time is lengthened, the MFP 1 may not perform the logout for the user even if the user who carries the portable terminal 3 temporarily leaves the detection area (for example, unintentionally leaves the detection area).

If the second period of time, elapses since the object leaving the detection area leaves the detection area (Yes in ACT 34), the processor 10 determines whether the object leaving the detection area is in the login state (ACT 36). If the object leaving the detection area is in the login state (Yes in ACT 36), the processor 10 executes a logout process (ACT 37). If the object leaving the detection area enters the detection area again before the second period of time elapses (Yes in ACT 35), the processor 10 continues the login state of the user and returns to the process in ACT 31.

Here, the MFP 1 has a setting of shifting to the sleep state if a third period of the time elapses since the object leaving the detection area leaves the detection area. The third period of time can be set by the user or the administrator. For example, by setting the third period of time to "0", the MFP 1 can immediately shift to the sleep state soon as it detects the object leaving the detection area. If the third period of time is lengthened, even when the user who carries the portable terminal 3 temporarily leaves the detection area, if that period is within the third period of time (for example, unintentionally leaving the detection area), the MFP may not shift to the sleep state.

If the object leaving the detection area enters the detection area again before the third period of time elapses (No in ACT 38 and Yes in ACT 39), the processor 10 returns to the ACT 31 to enter the operable state.

If the third period of time elapses since the object leaving the detection area leaves the detection area (Yes in ACT 38), the processor 10 the MFP 1 determines whether to shift to the sleep state (ACT 40). If the sleep function after the user leaves is set to be enabled (Yes in ACT 40), the processor 10 of the MFP 1 shifts to the sleep state (ACT 41).

The third period may be the same as the second period of time. However, in the case of the operation of shifting to the sleep state after the logout, the third period of time is set to be equal to or longer than the second period of time. In the MFP 1 having the function of performing logout and shifting to the sleep state when a predetermined period time (auto-off time) elapses since the last operation is performed, the second period of time and third period of time are set to be shorter than the auto-off time. As a result, even before the auto-off time elapses, it is possible to perform logout or shift to the sleep state according to the object leaving the detection area. In this case, efficient operation according to the movement of the user can be realized without waiting for the elapse of the auto-off time.

According to the above operation, the MFP can detect that the user leaves the detection area according to the leaving information from the portable terminal, wherein the user carries the portable terminal capable of receiving the signal from the beacon terminal.

According to the present embodiment, the MFP performs logout for the user when the set time (second period of time) elapses since the leaving of the user is detected according to the leaving information. Thus, without performing a specific operation for logout, it is possible to log out according to the elapse of the time since the user leaves the detection area.

According to the present embodiment, if the sleep function is enabled, the MFP shifts to the sleep state when the setting time (third period of time) elapses since the leaving of the user is detected according to the leaving information. Accordingly, the MFP can shift to the sleep state according to the elapse of the time since the user leaves the detection area, and the operation control in response to the behavior of the user can be performed.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
   a communication interface configured to communicate with a portable terminal capable of receiving a signal from a transmitter in a detection area; and
   a processor configured to determine whether to shift to an operable state from a sleep state based on user information contained in proximity information when the proximity information, containing the user information indicating that a user enters the detection area, is received by the communication interface from the portable terminal receiving a signal from the transmitter,
   wherein when the portable terminal is determined to have been within the detection area for a first period of time, the processor is configured to shift to the operable state.

2. The image forming apparatus according to claim 1, wherein the image forming apparatus includes the transmitter.

3. The image forming apparatus according to claim 1, wherein the processor is configured to control the transmitter to transmit a signal to the portable terminal including information identifying the image forming apparatus.

4. The image forming apparatus according to claim 1, wherein the processor is configured to control the transmitter to transmit within the detection area a signal having a signal strength greater than a threshold value.

5. The image forming apparatus according to claim 1, wherein the portable terminal is one of a smartphone, a wearable terminal, a mobile phone or a tablet PC.

6. The image forming apparatus according to claim 1, wherein after the processor shifts to the operable state, the processor is configured to execute login processing.

7. The image forming apparatus according to claim 1, wherein when the portable terminal is determined to have left the detection area before a first period of time, the processor is configured to terminate monitoring of the portable terminal.

8. The image forming apparatus according to claim 1, further comprising:
   a memory configured to hold identification information of a user, wherein
   when identification information of the user contained in the proximity information is coincident with the identification information of the user stored in the memory, the processor is configured to be logged into by the user specified by the coincident identification information.

9. An image forming apparatus, comprising:
   a communication interface configured to communicate with a portable terminal capable of receiving a signal from a transmitter in a detection area; and
   a processor configured to determine whether to shift to an operable state from a sleep state based on user information contained in proximity information when the proximity information, containing the user information indicating that a user enters the detection area, is received by the communication interface from the portable terminal receiving a signal from the transmitter, wherein the processor is configured to shift from the sleep state to the operable state when a portable terminal entering the detection area is determined to exist in the detection region even after a setting time elapses.

10. An image forming apparatus, comprising:
    a communication interface configured to communicate with a portable terminal capable of receiving a signal from a transmitter in a detection area; and
    a processor configured to determine whether to shift to an operable state from a sleep state based on user information contained in proximity information when the proximity information, containing the user information indicating that a user enters the detection area, is received by the communication interface from the portable terminal receiving a signal from the transmitter,
    wherein when leaving information including user information indicating that the user leaves the detection area is received by the communication interface from the portable terminal, when a user indicated by the user information contained in the leaving information is in a login state, the processor is configured to perform a logout operation, wherein after the processor performs a logout operation, when the portable terminal is determined to have left the detection area for a period of time, the processor is configured to shift to the sleep state.

11. A method of operating an image forming apparatus, comprising:

communicating with a portable terminal capable of receiving a signal from a transmitter in a detection area; and determining whether to shift to an operable state from a sleep state based on user information contained in proximity information when the proximity information, containing the user information indicating that a user enters the detection area, is received from the portable terminal receiving a signal from the transmitter, wherein when the portable terminal is determined to have been within the detection area for a first period of time, shifting to the operable state.

12. The method according to claim 11, further comprising controlling the transmitter to transmit a signal to the portable terminal including information identifying the image forming apparatus.

13. The method according to claim 11, wherein when identification information of a user contained in the proximity information is coincident with the identification information of the user stored in a memory, logging into by the user specified by the coincident identification information.

14. A method of operating an image forming apparatus, comprising:

communicating with a portable terminal capable of receiving a signal from a transmitter in a detection area;

determining whether to shift to an operable state from a sleep state based on user information contained in proximity information when the proximity information, containing the user information indicating that a user enters the detection area, is received from the portable terminal receiving a signal from the transmitter; and shifting from the sleep state to the operable state when the portable terminal entering the detection area is determined to exist in the detection region even after a setting time elapses.

* * * * *